United States Patent
Toda

(10) Patent No.: US 7,652,785 B2
(45) Date of Patent: Jan. 26, 2010

(54) CAMERA AND PRINTER SYSTEM AND METHOD ALLOWING CAPTURING AND FORMATTING MULTIPLE IMAGES BASED ON THE NUMBER RECEIVED

(75) Inventor: Katsuyuki Toda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 760 days.

(21) Appl. No.: 11/205,124

(22) Filed: Aug. 17, 2005

(65) Prior Publication Data

US 2006/0055961 A1   Mar. 16, 2006

(30) Foreign Application Priority Data

Sep. 14, 2004   (JP)   ............... 2004-266676

(51) Int. Cl.
   *G06K 15/00*   (2006.01)
   *H04N 5/222*   (2006.01)

(52) U.S. Cl. ............... 358/1.18; 358/1.16; 358/452; 715/223; 715/243; 715/248; 348/207.2; 348/231.2; 348/333.05

(58) Field of Classification Search ............ 358/1.1, 358/1.11–1.16, 302, 452, 471; 382/173, 382/177, 180; 348/333.02, 333.05, 207.2, 348/231.2; 715/240, 241–255, 222–224
See application file for complete search history.

(56) References Cited

U.S. PATENT DOCUMENTS

| | | | |
|---|---|---|---|
| 6,222,947 B1 | 4/2001 | Koba | |
| 6,563,542 B1 * | 5/2003 | Hatakenaka et al. | ... 348/333.02 |
| 6,661,919 B2 * | 12/2003 | Nicholson et al. | ............ 382/173 |
| 7,278,094 B1 * | 10/2007 | Dreyer et al. | ............... 715/234 |
| 7,474,801 B2 * | 1/2009 | Teo et al. | ..................... 715/243 |
| 2002/0144055 A1 * | 10/2002 | Nitta et al. | ................... 711/108 |
| 2003/0081235 A1 * | 5/2003 | Tanaka et al. | .............. 358/1.13 |
| 2004/0190055 A1 * | 9/2004 | Takamatsu et al. | ......... 358/1.15 |
| 2005/0055635 A1 * | 3/2005 | Bargeron et al. | ............ 715/525 |
| 2005/0172225 A1 * | 8/2005 | Kobashi et al. | ............. 715/517 |

FOREIGN PATENT DOCUMENTS

| | | |
|---|---|---|
| JP | 8-115323 | 5/1996 |
| JP | 10-108006 | 4/1998 |
| JP | 10-293856 | 11/1998 |
| JP | 11-8831 | 1/1999 |
| JP | 2000-71575 | 3/2000 |
| JP | 2002-16833 | 1/2002 |

OTHER PUBLICATIONS

W3C, Cascading Style Sheets, Level 2, Revision 1, CSS 2.1 Specification, W3C Candidate Recommendation Feb. 25, 2004, accessed from <http://www.w3.org/TR/2004/CR-CSS21-20040225/>, accessed Feb. 19, 2009.*

* cited by examiner

*Primary Examiner*—Kimberly A Williams
(74) *Attorney, Agent, or Firm*—Oblon, Spivak, McClelland, Maier & Neustadt, L.L.P.

(57) ABSTRACT

When a plurality of image data are received, a form data from among at least one form data and a format data from among at least one format data are selected based on number of the image data. The image data, selected form data and format data are combined to generate an output image.

25 Claims, 12 Drawing Sheets

FIG. 7A

| PRINTING POSITION |
| --- |
| SIZE |
| FONT |
| STYLE |
| COLOR |
| CHARACTER STRING TO BE PRINTED |
| IMAGE INDEX VALUE |

FIG. 7B

| DEPICTING POSITION |
| --- |
| LENGTH |
| LINE INTERVALS |
| THICKNESS OF LINES |
| COLOR OF LINES |
| NUMBER OF LINES |
| IMAGE INDEX VALUE |

FIG. 7C

| TYPE OF DEPICTION |
|---|
| METHOD OF DEPICTION |
| LINE COLOR |
| LINE THICKNESS |
| COLOR OF FILL |
| ASSEMBLY OF DEPICTION POSITIONS (INCLUDING CONTROL POINT) |
| IMAGE INDEX VALUE |

FIG. 7D

| DEPICTING POSITION |
|---|
| WIDTH AND HEIGHT OF SOURCE IMAGE |
| WIDTH AND HEIGHT OF DEPICTED IMAGE |
| NUMBER OF COLORS |
| DATA SIZE |
| IMAGE DATA |
| IMAGE INDEX VALUE |

CAMERA AND PRINTER SYSTEM AND METHOD ALLOWING CAPTURING AND FORMATTING MULTIPLE IMAGES BASED ON THE NUMBER RECEIVED

CROSS-REFERENCE TO RELATED APPLICATIONS

The present document incorporates by reference the entire contents of Japanese priority document, 2004-266676 filed in Japan on Sep. 14, 2004.

BACKGROUND OF THE INVENTION

1. Field of the Invention

The present invention relates to a technology for combining image data and format depicting data.

2. Description of the Related Art

Digital still cameras have become very popular. In these digital still cameras, photographed digital images are stored in a recording medium such as a memory card.

When printing the photographed digital images, the digital still camera is connected to an external device, such as a personal computer, and the photographed digital images are transmitted to the external device. The photographed digital images are then printed by a printer attached to the external device.

However, the job of connecting a digital still camera to a personal computer, transferring the photographed digital images from the digital still camera to the personal computer, connecting a printer to the personal computer, and operating the personal computer to print the photographed digital images on the printer is not an easy job for a common man. To make the printing process easy, there has been developed a technology in which a digital still camera can be directly connected to a printer.

Japanese Patent Application Laid Open Nos. H11-8831, 2000-71575, 2002-16833 disclose various techniques for printing images with or without using a personal computer.

In some conventional digital still cameras it is possible to insert images into spaces prepared in a template form. However, when the number of images to be printed does not match with the spaces in the form, an undesirable result is obtained. For example, when the spaces are more and the images to be printed are less, some of the spaces remain blank.

SUMMARY OF THE INVENTION

It is an object of the present invention to at least solve the problems in the conventional technology.

An image processing device according to one aspect of the present invention includes a storing unit that stores at least one form data, a plurality of image data, and at least one format data; a selecting unit that selects a form data and a format data from among the form data and the format data stored in the storing unit based on number of image data; and an image combining unit that combines the image data, selected form data and format data to generate an output image.

A method of combining an image and a form according to another aspect of the present invention includes comprising receiving a plurality of image data; selecting a form data from among at least one form data and a format data from among at least one format data based on number of the image data; and combining the image data, selected form data and format data to generate an output image.

An image forming device according to still another aspect of the present invention a storing unit that stores at least one form data, a plurality of image data, and at least one format data; a selecting unit that selects a form data and a format data from among the form data and the format data stored in the storing unit based on number of image data; an image combining unit that combines the image data, selected form data and format data to generate an output image; and an outputting unit that outputs the output image.

A printing system according to still another aspect of the present invention an image capturing unit configured to capture images; and a printing unit. The printer unit includes a storing unit that stores at least one form data, a plurality of image data corresponding to images captured by the image capturing unit, and at least one format data; a selecting unit that selects a form data and a format data from among the form data and the format data stored in the storing unit based on number of image data; and an image combining unit that combines the image data, selected form data and format data to generate an output image; and an outputting unit that outputs the output image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 7A to 7D are schematics of depicting data of form additional data;

DETAILED DESCRIPTION OF THE PREFERRED EMBODIMENTS

Exemplary embodiments of the present invention will be described below with reference to accompanying drawings. The present invention is not limited to these embodiments.

Figure 1:
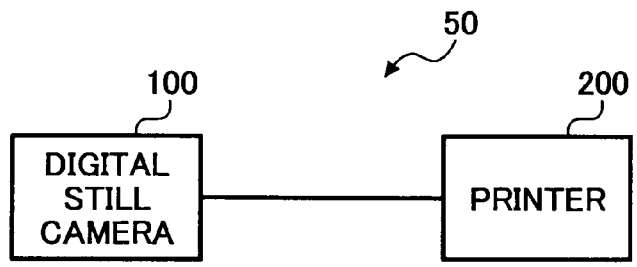
FIG. 1 is a block diagram of a digital still camera printing system according to an embodiment of the present invention.

FIG. 1 is a block diagram of a digital still camera printing system 50 according to an embodiment of the present invention. The digital still camera printing system 50 includes a digital still camera 100 that takes digital images, and a printer 200 that prints the digital images.

The digital still camera 100 and the printer 200 are capable of communicating with each other using a protocol and a data format that are compliant with the PictBridge standard established by the Camera & Imaging Products Association (CIPA) as DC-001-2003 Digital Photo Solutions for Imaging Devices.

Figure 2:
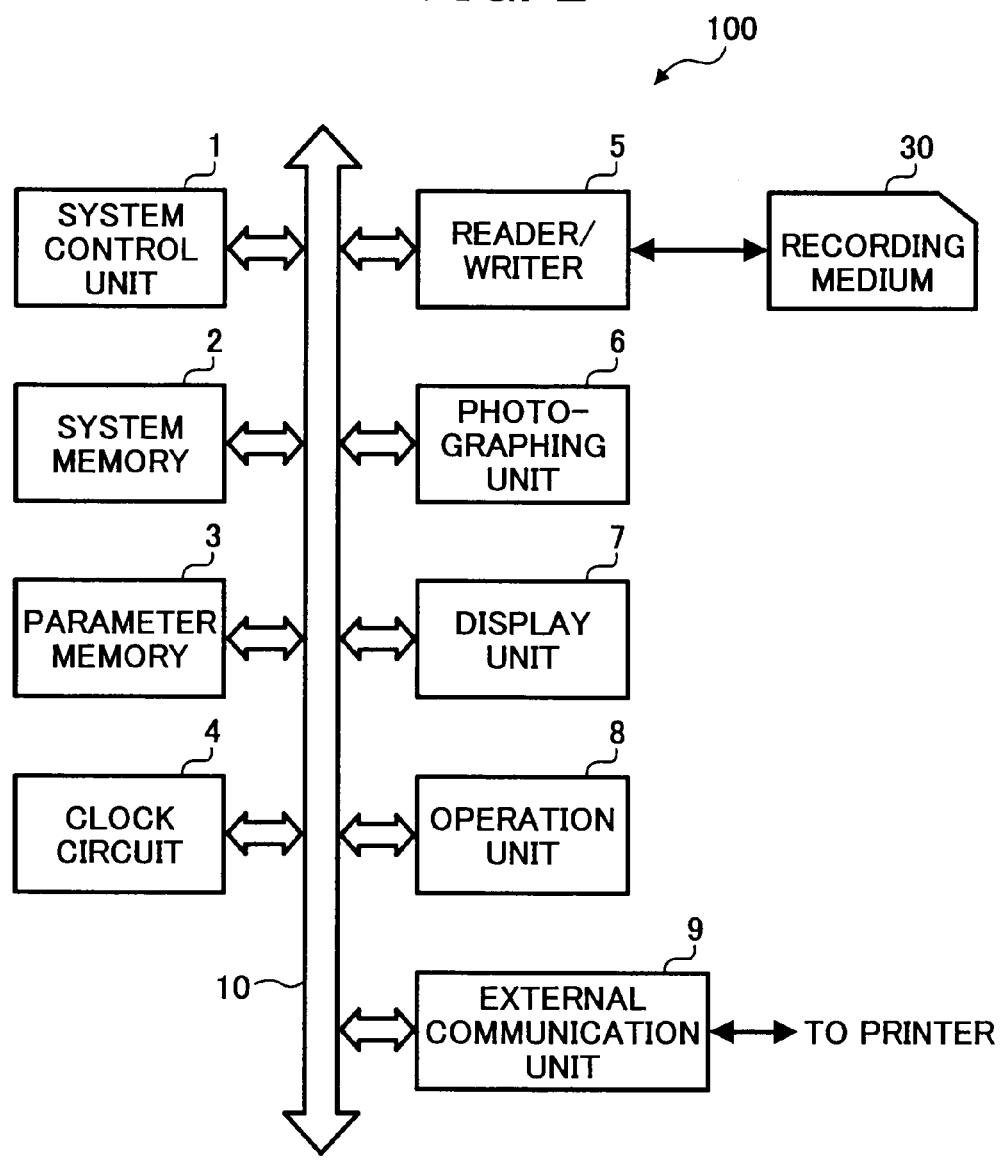
FIG. 2 is a detailed block diagram of a digital still camera shown in FIG. 1.

FIG. 2 is a detailed block diagram of the digital still camera 100. In the digital still camera 100, a system control unit 1 controls: each unit of the digital still camera 100; writing/reading of data to/from a recording medium 30; photographing; and communication between an external device via an external communication unit 9. Furthermore, the system control unit 1 performs various data processings, such as user interface processings when a user operates the digital still camera 100. A system memory 2 stores various control programs executed by the system control unit 1, and is used as a work area of the system control unit 1. A parameter memory 3 stores various data specific to the digital still camera 100, and a clock circuit 4 outputs the present time.

A reader/writer 5 is used to write/read data to/from the recording medium 30. A photographing unit 6 includes a camera mechanism used for photographing, an optical system, and a photoelectric converting unit. A display unit 7 displays various data to a user on a liquid crystal display. An operating unit 8 has various keys that a user can use when operating the digital still camera 100.

An external communication unit 9 connects the digital still camera 100 to an external device, such as the printer 200. As a result, the digital still camera 100 can exchange data with the external device via the external communication unit 9. The external communication unit 9 can be a versatile communication unit such as a USB.

The system control unit 1, the system memory 2, the parameter memory 3, the clock circuit 4, the reader/writer 5, the photographing unit 6, the display unit 7, the operation unit 8, and the external communication unit 9 are connected to each other by an internal bus 10. As a result, data can be exchanged between any two or more units via the internal bus 10.

Figure 3:
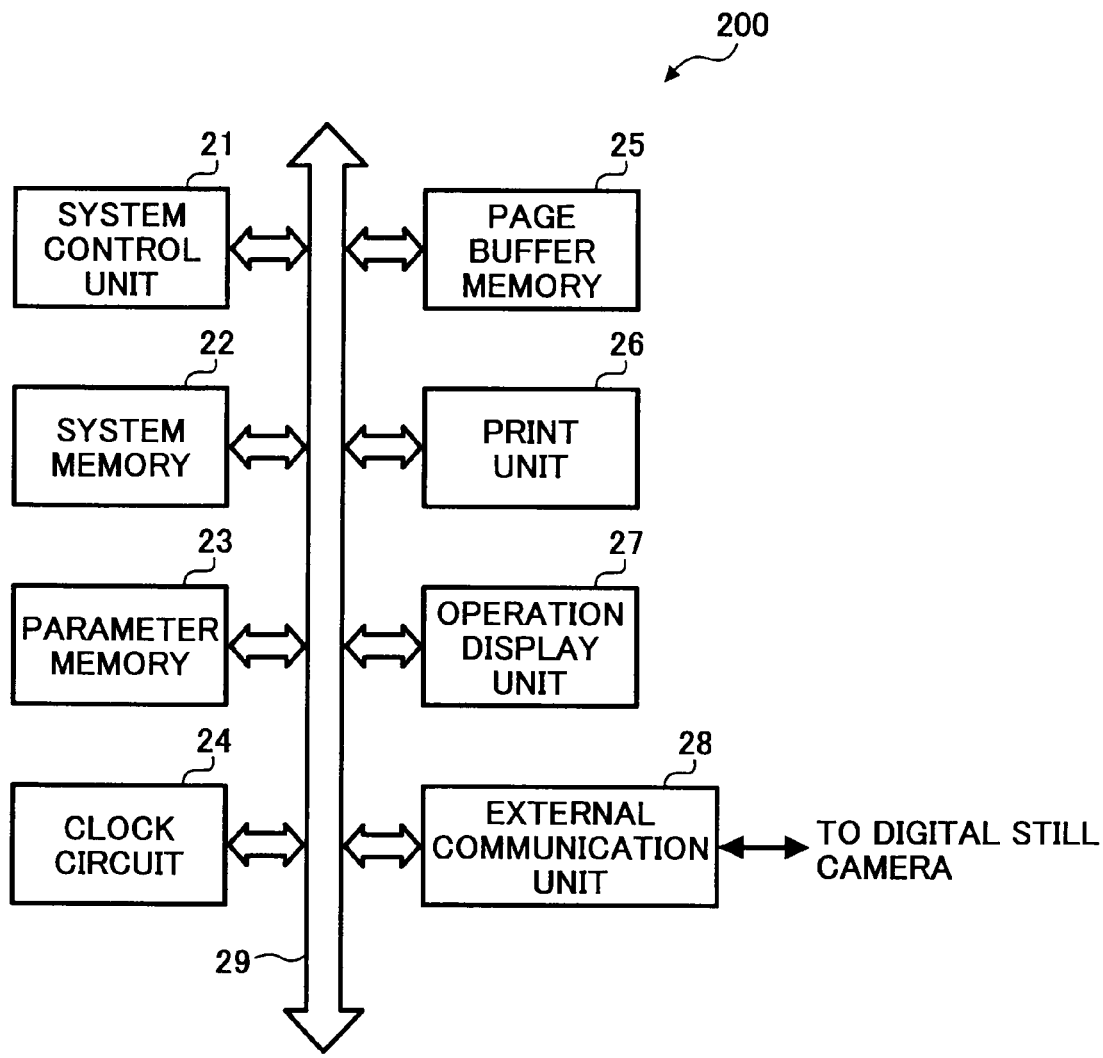
FIG. 3 is a detailed block diagram of a printer shown in FIG. 1.

FIG. 3 is a detailed block diagram of the printer 200. In the printer 200, a system control unit 21 controls: each unit of the printer 200; paper feeding; printing; and communication between an external device via an external communication unit 28. Moreover, the system control unit 21 performs various data processings, such as user interface processings when a user operates the printer 200. A system memory 22 stores various control programs executed by the system control unit 21, and is used as a work area of the system control unit 21. A parameter memory 23 stores various data specific to the printer 200, and a clock circuit 24 outputs the present time.

A page buffer memory 25 stores printing data of one page, a print unit 26 prints an image onto paper, and an operation display unit 27 is a user interface for a user to operate the printer 200.

The external communication unit 28 connects the printer 200 to an external device, such as the digital still camera 100. As a result the printer 200 can exchange data with the external device via the external communication unit 28. The external communication unit 28 can be a versatile communication unit such as a USB.

The system control unit 21, the system memory 22, the parameter memory 23, the clock circuit 24, the page buffer memory 25, the print unit 26, the operation display unit 27, and the external communication unit 28 are connected to each other by an internal bus 29. As a result, data can be exchanged between any two or more units via the internal bus 29.

Figure 4A:
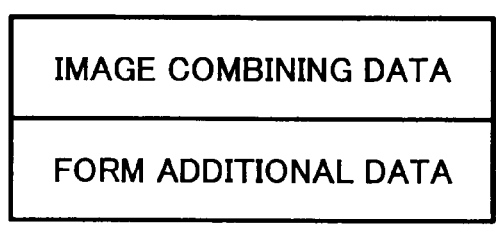
FIGS. 4A to 4D are examples of form data.

FIG. 4A is an example of form data stored in the printer 200. The printer 200 stores a plurality of such form data.

The form data includes image combining data and form additional data. The image combining data indicates how image data is to be laid out on a page. The form additional data includes depicting elements to be added to the page. There are two types of depicting data: a depicting element that is added to image data laid out on a page (image-associated additional-depicting-data), and a depicting element that is always added to a fixed position on a page (fixed additional-depicting-data).

Figure 4B:
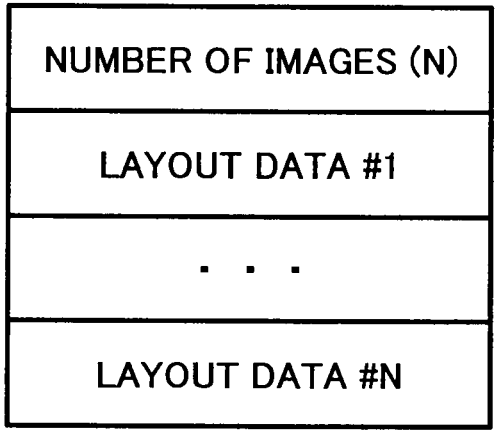
Figure 4C:
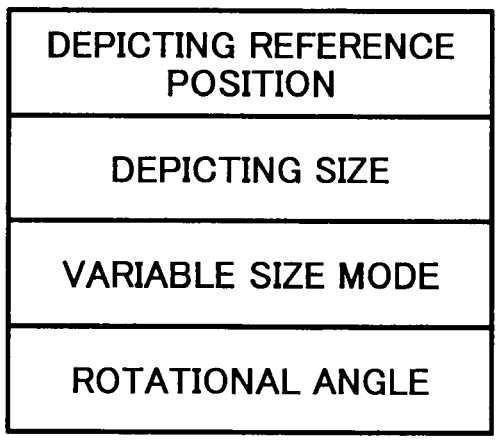

As shown in FIG. 4B, the image combining data includes number of images (N) on one page of a form that is created by the form data, and layout data #1 to #N defining a position of each of the images. As shown in FIG. 4C, each layout data includes a depicting reference position, a depicting size, a variable size mode, and a rotational angle.

Figure 5A:
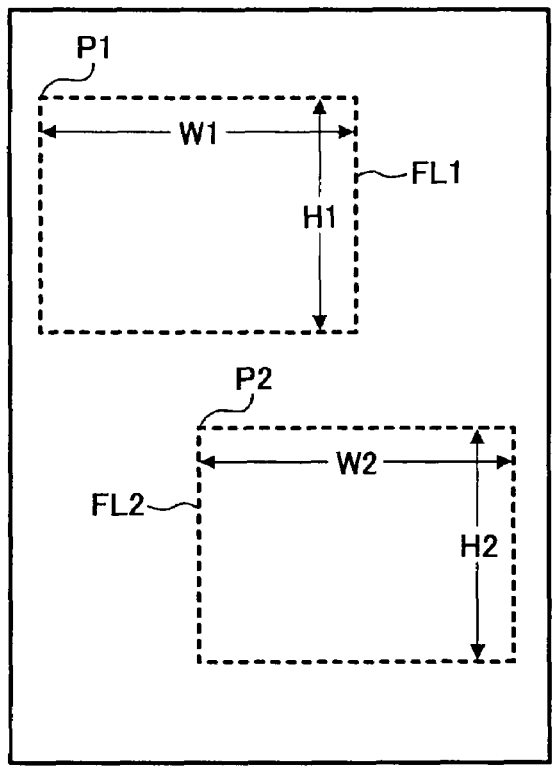
FIGS. 5A to 5D are schematics of a layout, form data, images, and a combined image.

In an example shown in FIG. 5A, there are two display frames FL1 and FL2 for laying out images on a page that is created by the form data. Thus, the image combining data includes two sets of layout data #1 and #2, corresponding to display frames FL1 and FL2. The layout data #1 includes a coordinate value of a point P1 at the top left corner in display frame FL1 as the depicting reference position, and a height H1 and a width W1 of the display frame FL1 as the depicting size. Moreover, 0 (zero) degrees is stored as the rotational angle, and "keep aspect ratio" is stored as the variable size mode.

Figure 6A:
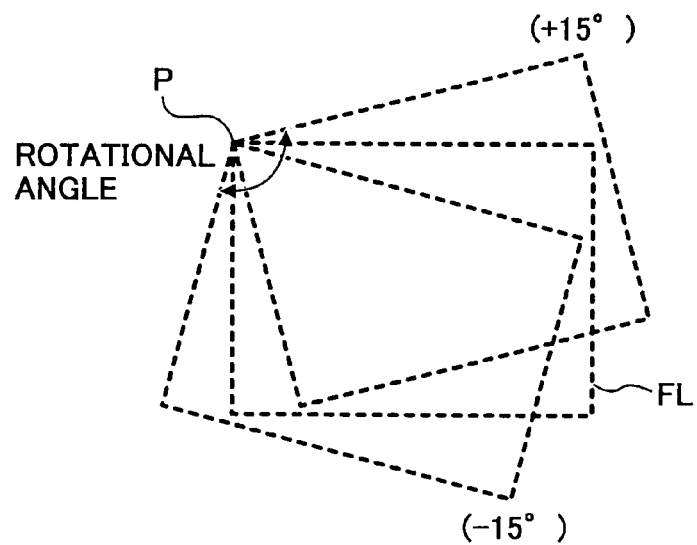
FIG. 6A is a schematic for explaining the concept of a rotation angle.

FIG. 6A is a schematic for explaining the concept of the rotational angle. The rotational angle is an angle around a reference point P in a frame FL. A rotational angle in an anti-clockwise direction is represented by a positive value, and a rotational angle in a clockwise direction is represented by a negative value.

Figure 6B:
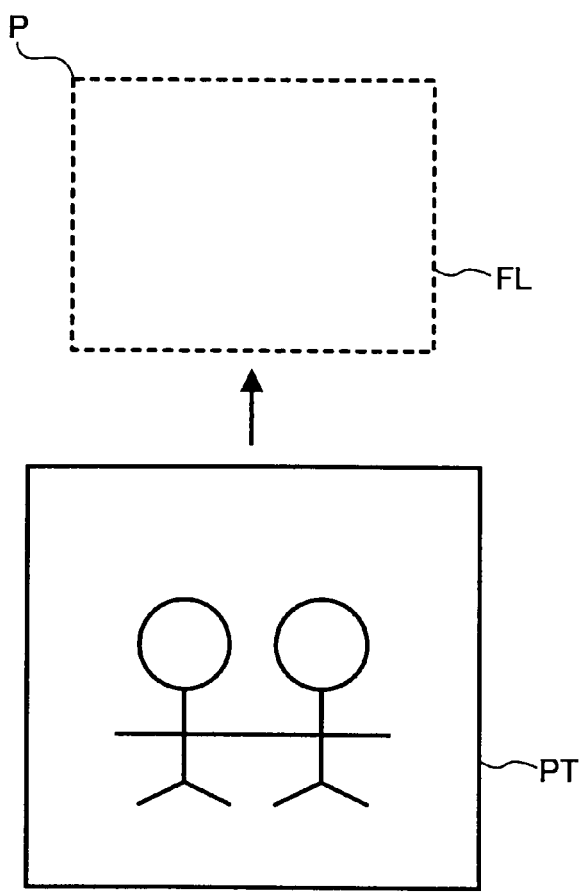
FIGS. 6B to 6D are schematics for describing variable size modes.
Figure 6C:
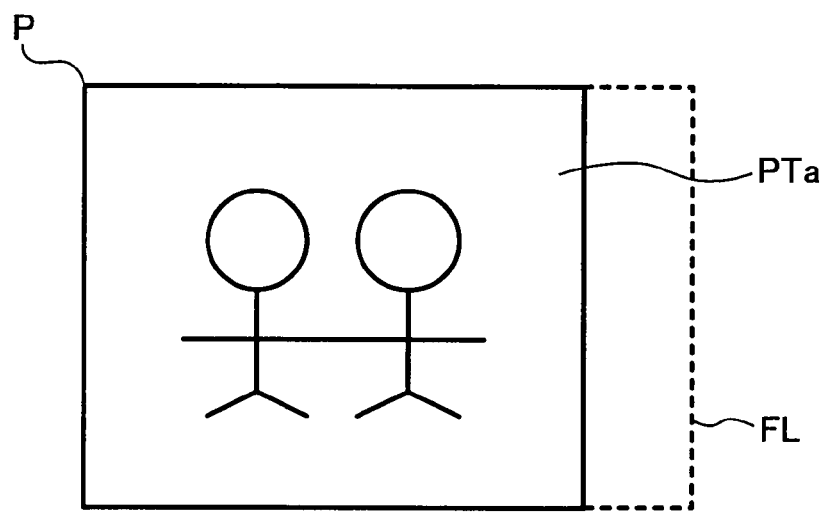
Figure 6D:
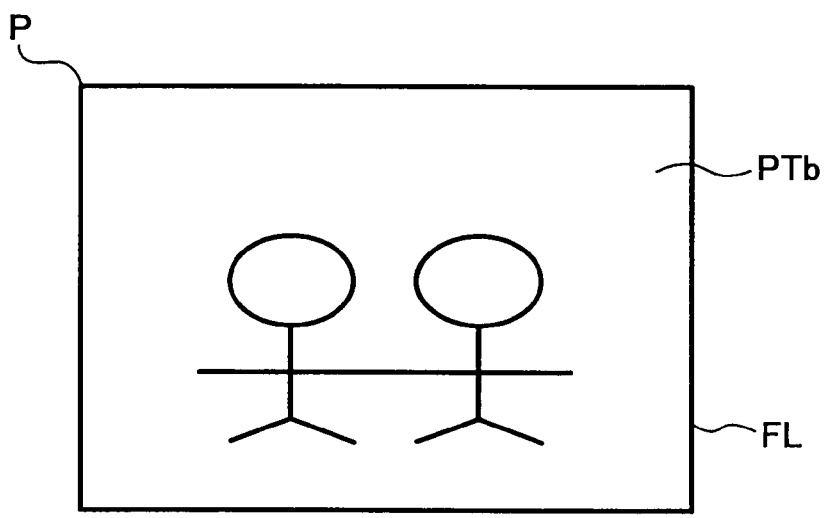

There are two types of variable size modes: "keep aspect ratio (ratio of height and width)"; and "fit in display frame". FIG. 6B is a diagram showing an example of fitting a foreground image PT into the display frame FL that is smaller than the foreground image PT. When the "keep aspect ratio" mode is set, as shown in FIG. 6C, a reduced image PTa of the foreground image PT is fit into the display frame FL by retaining the aspect ratio. Specifically, the height is reduced to match that of the display frame FL, and the width is reduced correspondingly so that the reduced image PTa has the same aspect ratio as the foreground image PT. On the other hand, when the "fit in display frame" mode is set, as shown in FIG. 6D, a reduced image PTb of the foreground image PT is reduced into the same size as the display frame FL. Specifically, both the height and the width are reduced to match that of the display frame FL.

Figure 4D:
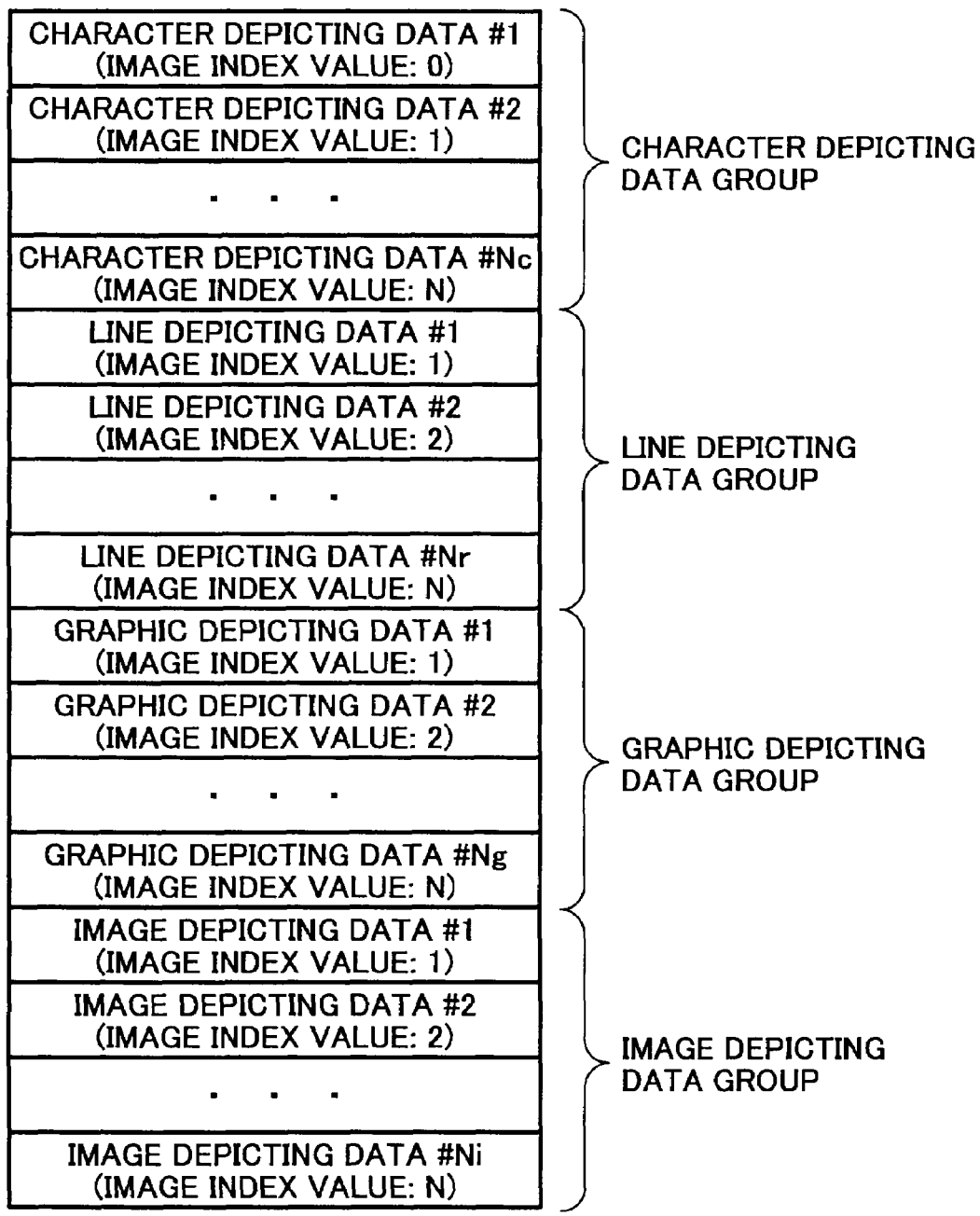

As shown in FIG. 4D, the form additional data includes a character depicting data group, a line depicting data group, a graphic depicting data group, and an image depicting data group.

The character depicting data group includes an Nc number of character depicting data. The character depicting data is sorted in an ascending order of an image index value.

The line depicting data group includes an Nr number of line depicting data. The line depicting data is sorted in an ascending order of an image index value.

The graphic depicting data group includes an Ng number of graphic depicting data. The graphic depicting data is sorted in an ascending order of an image index value.

The image depicting data group includes an Ni number of image depicting data. The image depicting data is sorted in an ascending order of an image index value.

The image index value is a value for referring to an image corresponding to the layout data in the image combining data.

For example, an image index value 1 means that the data (image-associated additional-depicting-data) is added to a position associated to an image according to layout data #1. An image index value 0 means that the data is not associated to an image (fixed additional-depicting-data).

As shown in FIG. 7A, the character depicting data includes a printing position that is a position where a character string is to be printed on a form (character reference position coordinate), a size, a font, style (bold, italic, etc.), a color, the character string, and an image index value. For example, in form data shown in FIG. 5B, the character string "P/" at the top right corner are depicted according to character depicting data #1 (image index value: 0). This character string is indicated by a value "P pp/PP"; "pp" indicates a page number and "PP" indicates a total number of pages.

Figure 5B:
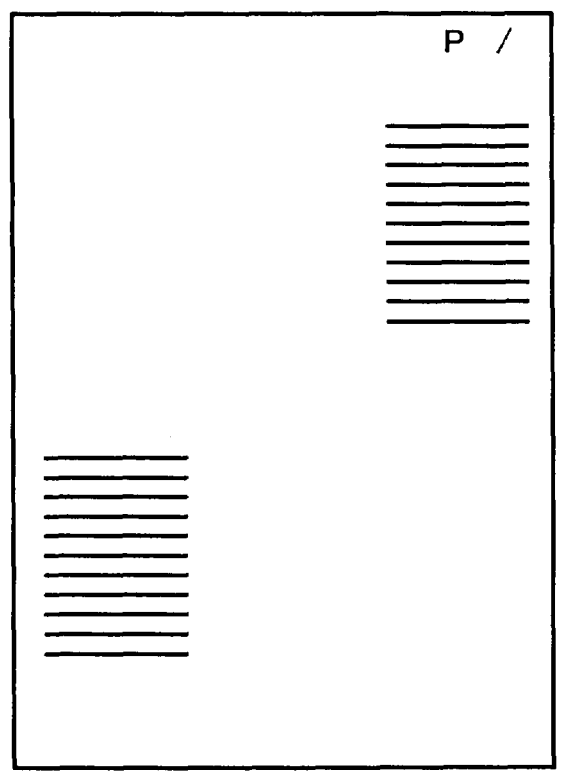
Figure 5C:
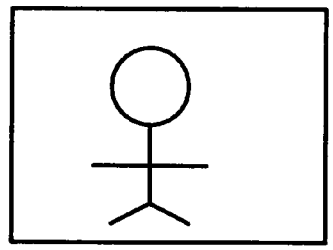
Figure 5C:
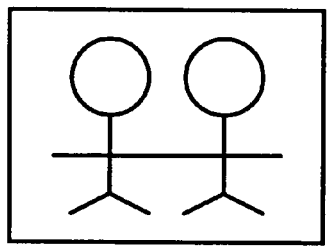

As shown in FIG. 7B, the line depicting data includes a depicting position on a form (depicting reference position), length, line intervals, thickness of lines, color of lines, number of lines, and an image index value. For example, in the form data as shown in FIG. 5B, there are two spaces for laying out images, and lines are provided at positions associated to each space, so that a user can write in a memo. These lines are depicted according to line depicting data #1 (image index value: 1) and line depicting data #2 (image index value: 2), respectively.

As shown in FIG. 7C, the graphic depicting data includes type of depiction (assembly of lines/bezier curve), method of depiction (line only, fill (even-odd rule, non-zero winding rule), line and fill), line color, line thickness, color of fill, a depiction position (assembly of depiction positions, including control point in the case of bezier curve), and an image index value.

As shown in FIG. 7D, the image depicting data includes a depicting position on a form (depicting reference position), a width and a height of a source image, a width and a height of a depicted image, number of colors (monochrome, 256 colors, full-color), data size, image data, and an image index value.

Figure 5D:
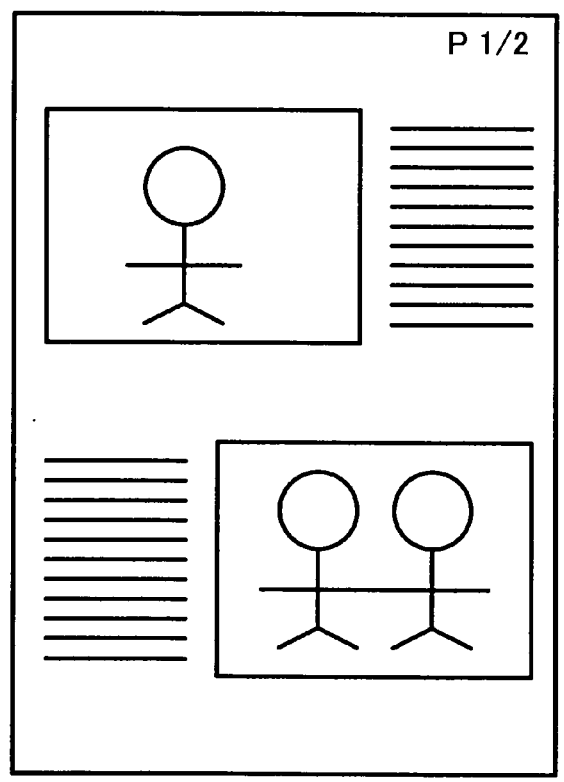

The form data shown in FIGS. 5A to 5D includes two spaces for images on one page. When a user selects three images, the first page including two images is printed out, as shown in FIG. 5D.

Figure 8:
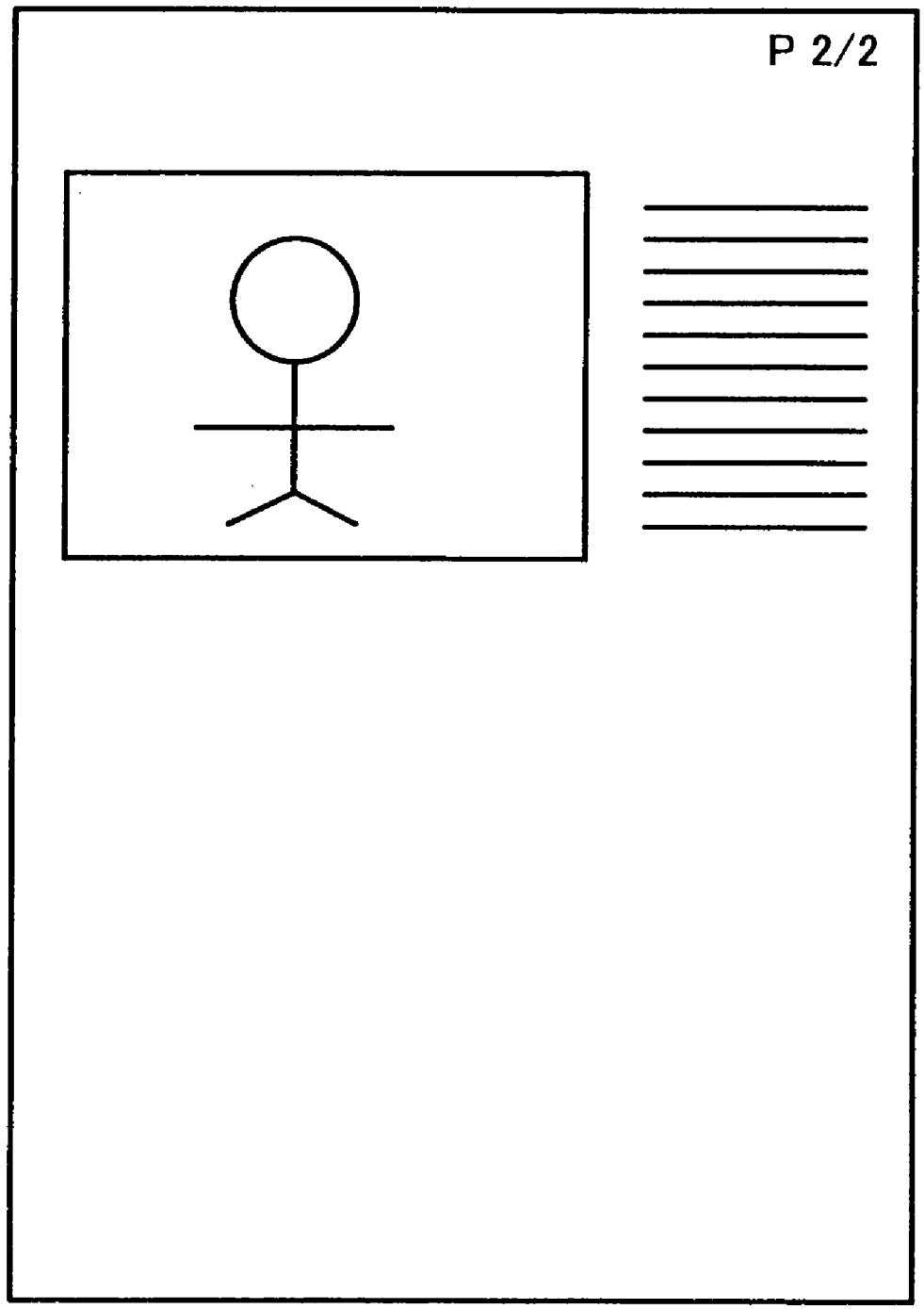
FIG. 8 is a schematic of a combined document created according to the embodiment.

The second page is printed out as shown in FIG. 8. Specifically, the third image is positioned at the space for a first image on the page, and lines are depicted at a position associated to the image. Moreover, the space for a second image on the page is left blank, without any lines depicted.

According to the embodiment, when a page is created according to form data, and the page has a blank space because there are more spaces than the number of images selected for printing, depicting elements (characters, lines, graphics, etc.) associated to the blank space are not printed. Thus, unnecessary form elements are omitted, so that a desirable output is obtained. Moreover, unnecessary consumption of color material of the printer 200 (toner, ink, etc.) is suppressed.

Figure 9:
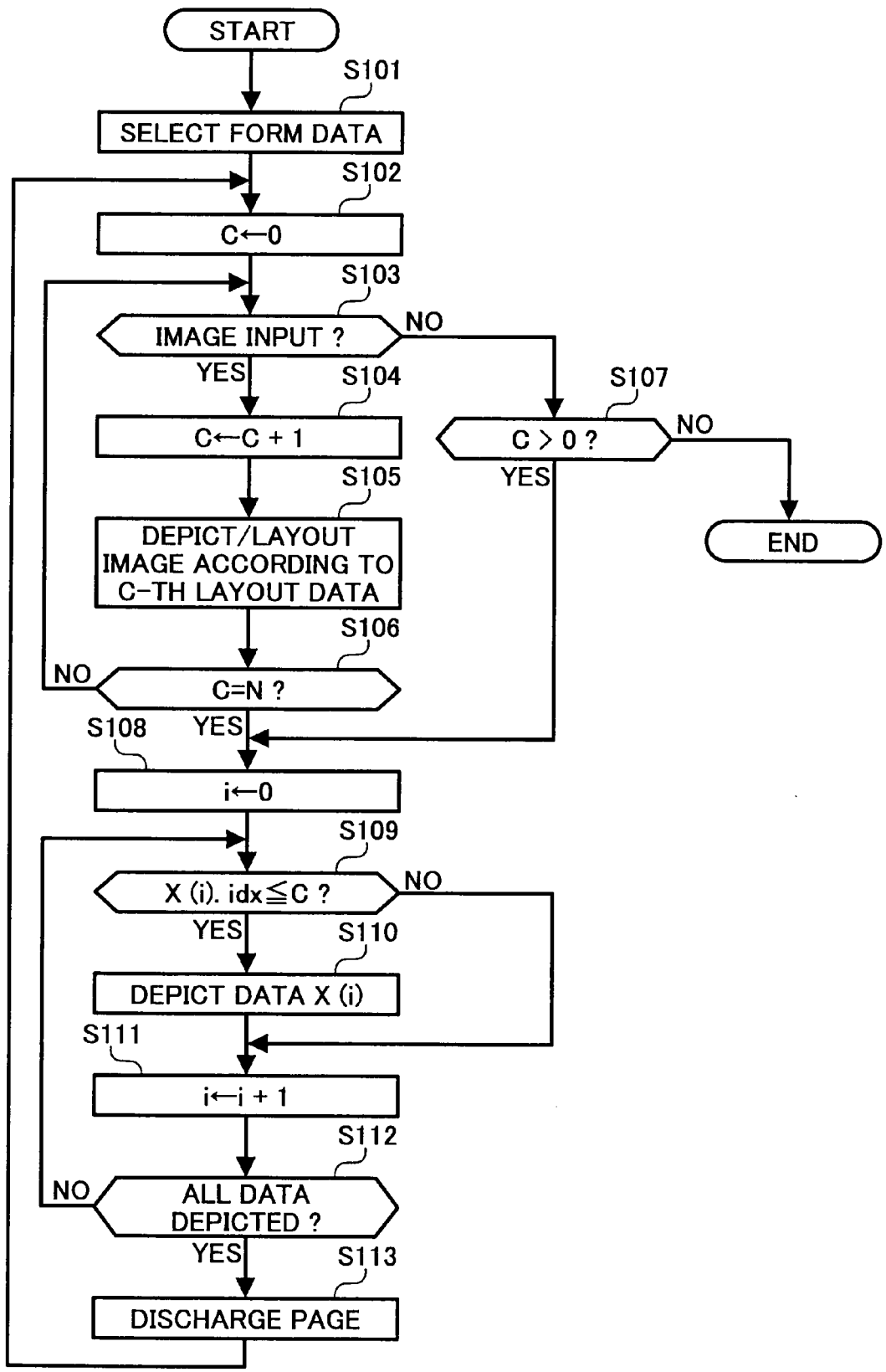
FIG. 9 is a flowchart of a printing processing performed by the printer.

FIG. 9 is a flowchart of a printing processing performed by the printer 200. In this printing processing, a plurality of images selected by a user is transferred from the digital still camera 100 to be printed out on one page.

A user is made to select a form data (step S101). Operation guidance and a list of form data can be displayed on the operation display unit 27 to facilitate the selection.

The printer 200 sets a variable C of the number of images to be included on one page to "0" (step S102), and determines whether an image is input from the digital still camera 100 (step S103). When the result of the determination made at step S103 is YES, the printer 200 adds "1" to the variable C (step S104), positions the input image on a page according to Cth layout data (layout data #C), and issues a depicting command to a lower processing layer (step S105).

The printer determines whether the variable C reached a number N of images that can be included in one page (step S106). When the result of the determination made at step S106 is NO, the system control returns to step S103, and determines whether a next image is input.

When the digital still camera 100 finishes inputting images to the printer 200, and the result of the determination made at step S103 is NO, the printer 200 determines whether the variable C is more than "0" (step S107). When the result of the determination made at step S107 is NO, the image printing processing ends.

When the printer 200 finishes depicting images for one page and the result of the determination made at step S106 is YES, or when the digital still camera 100 finishes inputting images to the printer 200 but the last page is not discharged and the result of the determination made at step S107 is YES, the processing proceeds to step S108. At this point, the variable C retains the number of images to be included on the page to be printed out.

At step S108, the printer 200 sets a variable i to "0". The variable i is used for sequentially scanning all the depicting data included in the form additional data. The printer 200 acquires an i-th element in the depicting data, and determines whether the image index value of the acquired element is smaller than the variable C (step S109).

When the result of the determination made at step S109 is YES, the printer 200 issues, to a lower processing layer, a depicting command to depict the contents of the i-th element (step S110). When the result of the determination made at step S109 is NO, step S110 is not performed.

The printer 200 adds "1" to the variable i (step S111), and determines whether processings for all depicting data are completed (step S112). When the result of the determination made at step S112 is NO, the system control returns to step S109, and performs processings for remaining depicting data.

When the result of the determination made at step S112 is YES, the printer 200 discharges the depicted page (step S113), returns to step S103, and performs processings for a next page.

Similar results can be obtained by replacing the digital still camera 100 with a digital video camera having a function of a digital still camera. Moreover, similar results can be obtained by replacing the digital still camera 100 with a mobile terminal having a function of a digital still camera.

It is sufficient that the images are available, and it is not necessary that the images be taken with a camera. In other words, the images can be images prestored in a hard disk of a computer, or can be images scanned with a scanning function of a scanner, a composite machine, or a copier. The images can also be downloaded via a network such as the Internet. In other words, instead of connecting the printer 200 to the digital still camera 100 as shown in FIG. 1, the printer 200 can be connected to a computer having a hard disk with prestored images or a communication function that allows downloading of images via a network, or the printer 200 can be connected to, or incorporated in, a scanner, a composite machine, or a copier.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
    an image inputting unit that is connected to an image data generating device that generates image data, and that inputs the image data generated by the image data generating device,
    a storing unit that stores at least one form data, a plurality of image data, and at least one format data;
    a selecting unit that selects a form data and a format data from among the form data and the format data stored in the storing unit based on number of image data; and
    an image combining unit that combines the image data, selected form data and format data to generate a combined output image, wherein
    the image combining unit includes a combined-image outputting unit that, every time when one page of the combined output image is generated by the image combining unit, outputs the generated one page of the combined output image out of the combined output image.

2. The image processing device according to claim 1, wherein the format data includes
    layout data that specifies positional information of the image data on a page, and
    additional data about depicting elements added on the output image.

3. The image processing device according to claim 2, wherein the additional data includes
    variable data that is added on the output image at an arbitrary position in association with the image data, and
    fixed data that is added on the output image at a fixed position.

4. The image processing device according to claim 3, wherein the variable data and the fixed data include at least one of character depicting data for adding figures and characters, line depicting data for adding a line element, graphic depicting data for adding a graphic element, and image depicting data for adding an image element on the output image.

5. The image processing device according to claim 1, further comprising an image receiving unit that receives image data from outside and stores received image data in the storing unit.

6. The image processing device according to claim 1, further comprising an image capturing unit configured to capture images and that stores image data corresponding to captured images in the storing unit.

7. The image processing device according to claim 1, further comprising an image scanning unit configured to scan images and that stores image data corresponding to scanned images in the storing unit.

8. A method of combining an image and a form, comprising:
    receiving at an image input device a plurality of image data generated by an image data generating device;
    selecting a form data from among at least one form data stored in a storing unit, and selecting a format data from among at least one format data stored in the storing unit based on number of the image data; and
    combining, in a combining unit, the image data, selected form data and format data to generate a combined output image, wherein
    the image combining includes outputting, every time when one page of the combined output image is generated by the combining unit, the generated one page of the combined output image out of the combined output image.

9. The method according to claim 8, wherein the format data includes
    layout data that specifies positional information of the image data on a page, and
    additional data about depicting elements added on the output image.

10. The method according to claim 9, wherein the additional data includes
    variable data that is added on the output image at an arbitrary position in association with the image data, and
    fixed data that is added on the output image at a fixed position.

11. The method according to claim 10, wherein the variable data and the fixed data include at least one of character depicting data for adding figures and characters, line depicting data for adding a line element, graphic depicting data for adding a graphic element, and image depicting data for adding an image element on the output image.

12. The method according to claim 8, wherein the receiving includes receiving the image data from outside.

13. The method according to claim 8, further comprising capturing images, wherein the receiving includes receiving image data corresponding to captured images.

14. The method according to claim 8, further comprising scanning images, wherein the receiving includes receiving image data corresponding to scanned images.

15. An image forming device comprising:
    an image inputting unit that is connected to an image data generating device that generates image data, and that inputs the image data generated by the image data generating device,
    a storing unit that stores at least one form data, a plurality of image data, and at least one format data;
    a selecting unit that selects a form data and a format data from among the form data and the format data stored in the storing unit based on number of image data;
    an image combining unit that combines the image data, selected form data and format data to generate a combined output image; and
    wherein the image combining unit includes a combined-image outputting unit that, every time when one page of the combined output image is generated by the image combining unit, outputs the generated one page of the combined output image out of the combined output image.

16. The image forming device according to claim 15, further comprising an image receiving unit that receives image data from outside and stores received image data in the storing unit.

17. The image forming device according to claim 15, wherein the format data includes
    layout data that specifies positional information of the image data on a page, and
    additional data about depicting elements added on the output image.

18. The image forming device according to claim 17, wherein the additional data includes
    variable data that is added on the output image at an arbitrary position in association with the image data, and
    fixed data that is added on the output image at a fixed position.

19. The image forming device according to claim 18, wherein the variable data and the fixed data include at least one of character depicting data for adding figures and characters, line depicting data for adding a line element, graphic depicting data for adding a graphic element, and image depicting data for adding an image element on the output image.

20. The image forming device according to claim 15, further comprising an image capturing unit configured to capture images and that stores image data corresponding to captured images in the storing unit.

21. The image forming device according to claim 15, further comprising an image scanning unit configured to scan images and that stores image data corresponding to scanned images in the storing unit.

22. A printing system comprising:
an image capturing unit configured to capture images; and
a printing unit that includes:
an image inputting unit that is connected to an image data generating device that generates image data, and that inputs the image data generated by the image data generating device,
a storing unit that stores at least one form data, a plurality of image data corresponding to images captured by the image capturing unit, and at least one format data;
a selecting unit that selects a form data and a format data from among the form data and the format data stored in the storing unit based on number of image data;
an image combining unit that combines the image data, selected form data and format data to generate a combined output image; and
wherein the image combining unit includes a combined-image outputting unit that, every time when one page of the combined output image is generated by the image combining unit, outputs the generated one page of the combined output image out of the combined output image.

23. The printing system according to claim 22, wherein the format data includes
layout data that specifies positional information of the image data on a page, and
additional data about depicting elements added on the output image.

24. The printing system according to claim 23, wherein the additional data includes
variable data that is added on the output image at an arbitrary position in association with the image data, and
fixed data that is added on the output image at a fixed position.

25. The printing system according to claim 24, wherein the variable data and the fixed data include at least one of character depicting data for adding figures and characters, line depicting data for adding a line element, graphic depicting data for adding a graphic element, and image depicting data for adding an image element on the output image.

* * * * *